United States Patent
Ohata et al.

(10) Patent No.: US 6,738,341 B2
(45) Date of Patent: May 18, 2004

(54) REWRITABLE OPTICAL DISK WITH SPARE AREA AND OPTICAL DISK PROCESSING APPARATUS

(75) Inventors: Hiroyuki Ohata, Tokyo (JP); Kazuhiko Nakane, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/174,958

(22) Filed: Jun. 20, 2002

(65) Prior Publication Data

US 2002/0159382 A1 Oct. 31, 2002

Related U.S. Application Data

(62) Division of application No. 09/206,402, filed on Dec. 7, 1998, now Pat. No. 6,469,978.

(30) Foreign Application Priority Data

Dec. 18, 1997 (JP) .......................................... 97-349805

(51) Int. Cl.⁷ ................................................ G11B 7/00
(52) U.S. Cl. ................................. 369/275.3; 369/53.17
(58) Field of Search ......................... 369/47.54, 47.55, 369/47.14, 53.15, 53.16, 53.17, 53.2, 275.3

(56) References Cited

U.S. PATENT DOCUMENTS

| | | | |
|---|---|---|---|
| 5,111,444 A | * | 5/1992 | Fukushima et al. ...... 369/53.17 |
| 5,235,585 A | | 8/1993 | Bish et al. |
| 5,319,626 A | | 6/1994 | Ozaki et al. |
| 6,418,111 B1 | * | 7/2002 | Takemura et al. ........ 369/275.3 |

FOREIGN PATENT DOCUMENTS

| | | |
|---|---|---|
| EP | 0798712 | 10/1997 |
| EP | 0798714 | 10/1997 |
| EP | 0813189 | 12/1997 |
| GB | 2326015 A | 12/1998 |

OTHER PUBLICATIONS

Standard ECMA—272 120 mm DVD Rewritable Disk (DVD–RAM) pp 41–42.

S tandard ECMA—201 Data Interchange on 90 mm Opt ical Disk Cartridfes Capacity: 230 Megabytes per Cartridge pp. 41, 43, 44, 47, 48.

\* cited by examiner

*Primary Examiner*—Paul W. Huber
(74) *Attorney, Agent, or Firm*—Birch, Stewart, Kolasch & Birch, LLP

(57) ABSTRACT

In order to enable recording and reproduction from optical disks with defect management formatted with different group configurations without changing the firmware of the conventional apparatus and to allow the size of the spare area to be specified at initialization, the position information indicating the position of the defect management area is recorded in the control data area provided in the read-only area of the optical disk, and the information indicating the first address or size of the spare area is included in the defect management area.

8 Claims, 19 Drawing Sheets

$spn(N) = k \cdot tn(N) \cdot sn(N)$ k : CONSTANT

FIG. 7A

| ZONE NUMBER | NUMBER OF SECTORS IN USER AREA us | NUMBER OF SECTORS IN SPARE AREA ss | ss/us (%) |
|---|---|---|---|
| 0 | 1000 | 10 | 1.000 |
| 1 | 1200 | 11 | 0.917 |
| 2 | 1400 | 12 | 0.857 |
| 3 | 1600 | 13 | 0.813 |
| 4 | 1800 | 14 | 0.778 |
| 5 | 2000 | 15 | 0.750 |
| 6 | 2200 | 16 | 0.727 |

FIG. 7B

| ZONE NUMBER | NUMBER OF SECTORS IN USER AREA us | NUMBER OF SECTORS IN SPARE AREA ss | ss/us (%) |
|---|---|---|---|
| 0 | 2200 | 32 | 1.455 |
| 1 | 2000 | 28 | 1.400 |
| 2 | 1800 | 24 | 1.333 |
| 3 | 1600 | 20 | 1.250 |
| 4 | 1400 | 16 | 1.143 |
| 5 | 1200 | 12 | 1.000 |
| 6 | 1000 | 8 | 0.800 |

FIG. 8

| ZONE NUMBER | NUMBER OF SECTORS IN USER AREA us | NUMBER OF SECTORS IN SPARE AREA ss | ss/us (%) |
|---|---|---|---|
| 0 | 1000 | 20 | 2.000 |
| 1 | 1200 | 12 | 1.000 |
| 2 | 1400 | 14 | 1.000 |
| 3 | 1600 | 16 | 1.000 |
| 4 | 1800 | 18 | 1.000 |
| 5 | 2000 | 20 | 1.000 |
| 6 | 2200 | 22 | 1.000 |

FIG. 10

| ZONE NUMBER | NUMBER OF SECTORS IN USER AREA us | NUMBER OF SECTORS IN SPARE AREA ss | ss/us (%) |
|---|---|---|---|
| 0 | 1000 | 20 | 2.000 |
| 1 | 1200 | 12 | 1.000 |
| 2 | 1400 | 14 | 1.000 |
| 3 | 1600 | 16 | 1.000 |
| 4 | 1800 | 18 | 1.000 |
| 5 | 2000 | 20 | 1.000 |
| 6 | 2200 | 44 | 2.000 |

FIG. 14

| ZONE NO. | RADIUS (mm) | sn(N) (SECTORS) | bn(N) (BLOCKS) | GB1 (BLOCKS) | UB (BLOCKS) | SB (BLOCKS) | GB2 (BLOCKS) | SB/UB (%) |
|---|---|---|---|---|---|---|---|---|
| 0 | 24.00 | 25 | 2550 | 256 | 2215 | 75 | 4 | 3.39 |
| 1 | 24.96 | 26 | 2652 | 4 | 2566 | 78 | 4 | 3.04 |
| 2 | 25.93 | 27 | 2754 | 4 | 2665 | 81 | 4 | 3.04 |
| 3 | 26.89 | 28 | 2856 | 4 | 2764 | 84 | 4 | 3.04 |
| 4 | 27.85 | 29 | 2958 | 4 | 2863 | 87 | 4 | 3.04 |
| 5 | 28.81 | 30 | 3060 | 4 | 2962 | 90 | 4 | 3.04 |
| 6 | 29.78 | 31 | 3162 | 4 | 3061 | 93 | 4 | 3.04 |
| 7 | 30.74 | 32 | 3264 | 4 | 3160 | 96 | 4 | 3.04 |
| 8 | 31.70 | 33 | 3366 | 5 | 3257 | 99 | 5 | 3.04 |
| 9 | 32.67 | 34 | 3468 | 5 | 3356 | 102 | 5 | 3.04 |
| 10 | 33.63 | 35 | 3570 | 5 | 3455 | 105 | 5 | 3.04 |
| 11 | 34.59 | 36 | 3672 | 5 | 3554 | 108 | 5 | 3.04 |
| 12 | 35.55 | 37 | 3774 | 5 | 3653 | 111 | 5 | 3.04 |
| 13 | 36.52 | 38 | 3876 | 5 | 3752 | 114 | 5 | 3.04 |
| 14 | 37.48 | 39 | 3978 | 5 | 3851 | 117 | 5 | 3.04 |
| 15 | 38.44 | 40 | 4080 | 5 | 3950 | 120 | 5 | 3.04 |
| 16 | 39.41 | 41 | 4182 | 6 | 4047 | 123 | 6 | 3.04 |
| 17 | 40.37 | 42 | 4284 | 6 | 4146 | 126 | 6 | 3.04 |
| 18 | 41.33 | 43 | 4386 | 6 | 4245 | 129 | 6 | 3.04 |
| 19 | 42.29 | 44 | 4488 | 6 | 4344 | 132 | 6 | 3.04 |
| 20 | 43.26 | 45 | 4590 | 6 | 4443 | 135 | 6 | 3.04 |
| 21 | 44.22 | 46 | 4692 | 6 | 4542 | 138 | 6 | 3.04 |
| 22 | 45.18 | 47 | 4794 | 6 | 4641 | 141 | 6 | 3.04 |
| 23 | 46.15 | 48 | 4896 | 6 | 4740 | 144 | 6 | 3.04 |
| 24 | 47.11 | 49 | 4998 | 7 | 4837 | 147 | 7 | 3.04 |
| 25 | 48.07 | 50 | 5100 | 7 | 4936 | 150 | 7 | 3.04 |
| 26 | 49.03 | 51 | 5202 | 7 | 5035 | 153 | 7 | 3.04 |
| 27 | 50.00 | 52 | 5304 | 7 | 5134 | 156 | 7 | 3.04 |
| 28 | 50.96 | 53 | 5406 | 7 | 5233 | 159 | 7 | 3.04 |
| 29 | 51.92 | 54 | 5508 | 7 | 5332 | 162 | 7 | 3.04 |
| 30 | 52.89 | 55 | 5610 | 7 | 5431 | 165 | 7 | 3.04 |
| 31 | 53.85 | 56 | 5712 | 7 | 5530 | 168 | 7 | 3.04 |
| 32 | 54.81 | 57 | 5814 | 8 | 5627 | 171 | 8 | 3.04 |
| 33 | 55.78 | 58 | 5916 | 8 | 5726 | 174 | 8 | 3.04 |
| 34 | 56.74 | 59 | 4956 | 8 | 4763 | 177 | 8 | 3.72 |

FIG. 15

| ZONE NO. | RADIUS (mm) | sn(N) (SECTORS) | bn(N) (BLOCKS) | GB1 (BLOCKS) | UB (BLOCKS) | SB (BLOCKS) | GB2 (BLOCKS) | SB/UB (%) |
|---|---|---|---|---|---|---|---|---|
| 0 | 24.00 | 25 | 2550 | 256 | 2200 | 90 | 4 | 4.09 |
| 1 | 24.96 | 26 | 2652 | 4 | 2552 | 92 | 4 | 3.61 |
| 2 | 25.93 | 27 | 2754 | 4 | 2652 | 94 | 4 | 3.54 |
| 3 | 26.89 | 28 | 2856 | 4 | 2752 | 96 | 4 | 3.49 |
| 4 | 27.85 | 29 | 2958 | 4 | 2852 | 98 | 4 | 3.44 |
| 5 | 28.81 | 30 | 3060 | 4 | 2952 | 100 | 4 | 3.39 |
| 6 | 29.78 | 31 | 3162 | 4 | 3052 | 102 | 4 | 3.34 |
| 7 | 30.74 | 32 | 3264 | 4 | 3152 | 104 | 4 | 3.30 |
| 8 | 31.70 | 33 | 3366 | 5 | 3250 | 106 | 5 | 3.26 |
| 9 | 32.67 | 34 | 3468 | 5 | 3350 | 108 | 5 | 3.22 |
| 10 | 33.63 | 35 | 3570 | 5 | 3450 | 110 | 5 | 3.19 |
| 11 | 34.59 | 36 | 3672 | 5 | 3550 | 112 | 5 | 3.15 |
| 12 | 35.55 | 37 | 3774 | 5 | 3650 | 114 | 5 | 3.12 |
| 13 | 36.52 | 38 | 3876 | 5 | 3750 | 116 | 5 | 3.09 |
| 14 | 37.48 | 39 | 3978 | 5 | 3850 | 118 | 5 | 3.06 |
| 15 | 38.44 | 40 | 4080 | 5 | 3950 | 120 | 5 | 3.04 |
| 16 | 39.41 | 41 | 4182 | 6 | 4048 | 122 | 6 | 3.01 |
| 17 | 40.37 | 42 | 4284 | 6 | 4148 | 124 | 6 | 2.99 |
| 18 | 41.33 | 43 | 4386 | 6 | 4248 | 126 | 6 | 2.97 |
| 19 | 42.29 | 44 | 4488 | 6 | 4348 | 128 | 6 | 2.94 |
| 20 | 43.26 | 45 | 4590 | 6 | 4448 | 130 | 6 | 2.92 |
| 21 | 44.22 | 46 | 4692 | 6 | 4548 | 132 | 6 | 2.90 |
| 22 | 45.18 | 47 | 4794 | 6 | 4648 | 134 | 6 | 2.88 |
| 23 | 46.15 | 48 | 4896 | 6 | 4748 | 136 | 6 | 2.86 |
| 24 | 47.11 | 49 | 4998 | 7 | 4846 | 138 | 7 | 2.85 |
| 25 | 48.07 | 50 | 5100 | 7 | 4946 | 140 | 7 | 2.83 |
| 26 | 49.03 | 51 | 5202 | 7 | 5046 | 142 | 7 | 2.81 |
| 27 | 50.00 | 52 | 5304 | 7 | 5146 | 144 | 7 | 2.80 |
| 28 | 50.96 | 53 | 5406 | 7 | 5246 | 146 | 7 | 2.78 |
| 29 | 51.92 | 54 | 5508 | 7 | 5346 | 148 | 7 | 2.77 |
| 30 | 52.89 | 55 | 5610 | 7 | 5446 | 150 | 7 | 2.75 |
| 31 | 53.85 | 56 | 5712 | 7 | 5546 | 152 | 7 | 2.74 |
| 32 | 54.81 | 57 | 5814 | 8 | 5644 | 154 | 8 | 2.73 |
| 33 | 55.78 | 58 | 5916 | 8 | 5744 | 156 | 8 | 2.72 |
| 34 | 56.74 | 59 | 4956 | 8 | 4760 | 180 | 8 | 3.78 |

FIG. 17
PRIOR ART

|  | START POSITION | | END POSITION | | NUMBER OF SECTORS |
|---|---|---|---|---|---|
|  | TRACK NO. | SECTOR NO. | TRACK NO. | SECTOR NO. |  |
| DMA 1 | 2 | 0 | 3 | 10 | 36 |
| DMA 2 | 3 | 14 | 4 | 24 | 36 |
| DMA 3 | 17935 | 0 | 17936 | 10 | 36 |
| DMA 4 | 17936 | 14 | 17937 | 24 | 36 |

FIG. 18A PRIOR ART

| | START POSITION | | END POSITION | | NUMBER OF SECTORS |
|---|---|---|---|---|---|
| | TRACK NO. | SECTOR NO. | TRACK NO. | SECTOR NO. | |
| DMA 1 | 4 | 0 | 5 | 12 | 38 |
| DMA 2 | 6 | 0 | 7 | 12 | 38 |
| DMA 3 | 42030 | 0 | 42031 | 12 | 38 |
| DMA 4 | 42032 | 0 | 42033 | 12 | 38 |

512-BYTE SECTOR

FIG. 18B PRIOR ART

| | START POSITION | | END POSITION | | NUMBER OF SECTORS |
|---|---|---|---|---|---|
| | TRACK NO. | SECTOR NO. | TRACK NO. | SECTOR NO. | |
| DMA 1 | 2 | 0 | 2 | 10 | 11 |
| DMA 2 | 4 | 0 | 4 | 10 | 11 |
| DMA 3 | 18473 | 0 | 18473 | 10 | 11 |
| DMA 4 | 18475 | 0 | 18473 | 10 | 11 |

2048-BYTE SECTOR

FIG. 19
PRIOR ART

| BAND NO. | NUMBER OF DATA TRACKS | NUMBER OF SPARE TRACKS | NUMBER OF SPARE TRACKS/NUMBER OF DATA TRACKS (%) |
|---|---|---|---|
| 0 | 1370 | 3 | 0.219 |
| 1 | 1465 | 3 | 0.205 |
| 2 | 1556 | 4 | 0.257 |
| 3 | 1648 | 4 | 0.243 |
| 4 | 1740 | 4 | 0.230 |
| 5 | 1832 | 4 | 0.218 |
| 6 | 1924 | 4 | 0.208 |
| 7 | 2015 | 5 | 0.248 |
| 8 | 2107 | 5 | 0.237 |
| 9 | 2196 | 5 | 0.223 |

REWRITABLE OPTICAL DISK WITH SPARE AREA AND OPTICAL DISK PROCESSING APPARATUS

This application is a divisional of application Ser. No. 09/206,402, filed on Dec. 7, 1998, now U.S. Pat. No. 6,469,978, the entire contents of which are hereby incorporated by reference and for which priority is claimed under 35 U.S.C. § 120; and this application claims priority of Application No. 9-349805 filed in Japan on Dec. 18, 1997 under 35 U.S.C. § 119.

BACKGROUND OF THE INVENTION

The present invention relates to an optical disk and optical disk processing apparatus, specifically a rewritable optical disk of which recording area is divided into a plurality of groups by annular boundaries, each of the above mentioned groups having a spare area having sectors which can be allocated in place of defective sectors of the disk, and an optical disk processing apparatus that is capable of recording and reproducing data from the optical disk.

The data zone format of the conventional optical disk will be described. FIG. 16 shows the data zone configuration of an optical disk described in "STANDARD ECMA-201, DATA INTERCHANGE ON 90 mm OPTICAL DISK CARTRIDGES." Although the standard relates to the fully read-only type, partially rewritable type, and fully rewritable type, the following description relates only to the fully rewritable type.

Referring to the figure, a data zone contains four defect management areas (DMAs). Two of them are placed before a user area, and the other two are placed after the user area. Buffer tracks are disposed on the radially inward side of the defect management area 1 and on the radially outward side of the defect management area 4. An area between the defect management area 2 and defect management area 3 is referred to as a user area, which forms a recording/reproducing area where user data is recorded or reproduced. Each defect management area contains a disk definition structure (DDS), a primary defect list (PDL), and a secondary defect list (SDL). DDS is recorded in the first sector of each DMA after the disk is initialized. The information stored there includes a code indicating the disk type of each group such as rewritable or read-only, and the first addresses of PDL and SDL. PDL contains the addresses of all defective sectors detected at initialization. SDL is placed immediately after PDL and contains the addresses of defective sectors and the addresses of replacement sectors for use in management of defective sectors detected at recording. PDL and SDL are defect (management) information for managing defective sectors in the optical disk. The sizes of PDL and SDL are determined by the length of the information stored therein. Identical PDLs and identical SDLs are recorded in the four defect management areas of the disk.

DMAs are placed at positions having the first address values predetermined on the disk. FIG. 17 shows the positions of DMAs on the conventional optical disk. The ECMA-201, which is explained as an example, specifies fixed values, as shown in FIG. 17.

The ISO/IEC 15041 standard regarding the same type of optical disk with different capacity defines a similar group configuration with two options of 512 bytes per sector and 2048 bytes per sector. FIG. 18A and FIG. 18B show the positions of DMAs on another type of conventional optical disk. As shown in FIG. 18A and FIG. 18B, the disk has fixed values which are different from the values of the example described earlier.

The drive apparatus that is capable of reproduction from the two types of disks described above incorporates information indicating the storage positions of DMAs of the disk types in its firmware.

The size of the spare area in each zone of these disks is substantially proportional to the size of the user area in the same zone. FIG. 19 shows the size of spare area of the conventional ECMA-201 optical disk. As shown in the figure, the number of spare tracks is determined so that the ratio of the number of spare tracks to the number of data tracks will not be smaller than 0.2%. The spare areas are located at the ends of the respective zones.

In the apparatus that drives the optical disk medium as described above, the position information sent from the host as a parameter of a read/write instruction is a logical address, and this must be converted into a physical address by the drive. In addition, the group configuration must be specified to identify the location of replacement sectors for defective sectors.

Because the conventional optical disks are configured as described above, it is necessary to add or modify the firmware of the optical disk apparatus that controls the conversion between physical addresses and logical addresses and the defect management which controls the allocation of spare areas when a medium having a different group configuration is introduced.

Also, the size of the defect management area for each group is fixed, and the sizes of defect management areas of a disk of a particular group configuration may be greater than necessary for some applications.

When a medium having a new group configuration is introduced, an optical disk apparatus which can be used only with the conventional group configuration is not capable of reproduction from the medium of the new group configuration because the information indicating the position of the area containing the position information of defective sectors and of the area storing the information indicating the group configuration cannot be obtained from the disk.

Since data is usually recorded from a zone including a sector having a lowest logical address, zones including sectors with lower logical addresses have higher probabilities of using the spare area. However, the sizes of spare areas in the different zones of the disk are substantially proportional to the sizes of the user areas in the zones. Accordingly, the error rates of data recorded in the zones of the disk are not uniform.

The zone including the sector having the lowest logical address value, e.g, value "0", contains various control data and requires a higher reliability. But because the size of the spare area in each zone of the disk is substantially proportional to the size of the user area in the zone, the reliability of the control data is insufficient.

SUMMARY OF THE INVENTION

The present invention has been made to solve these problems. An object of the invention is to provide an optical disk that can be used for recording and reproduction without changing the firmware of the conventional apparatus even when the optical disk is introduced with a different group configuration. Another object is to provide an optical disk and optical disk processing apparatus that permits the size of a spare area to be changed as desired by means of application programs. A further object is to provide an optical disk that makes it easy to allocate the spare area according to the user access frequency and the degree of importance of the data to be recorded.

According one aspect of the invention, there is provided a rewritable optical disk of which recording area is divided into a plurality of groups by annular boundaries;

the number of sectors per track differing from one group to another, said optical disk having a spare area provided for each of said groups and having sectors which can be allocated in place of defective sectors of the disk, and a user area in which the user is allowed to record and reproduce information;

said optical disk being configured so that the ratio of the number of sectors in the spare area to the number of sectors in the user area in at least one of a group containing a sector having the lowest logical address value and a group containing a sector having the largest logical address is higher than the corresponding ratios in other groups.

With the above arrangement, the permissible number of defective sectors due to defect or contamination increases in the zone containing important descriptors of the logical format, and the degree of degradation of the descriptor read/write performance is reduced. Accordingly, an optical disk with high immunity to defect can be provided.

It may be so arranged that, among said other groups, groups having lower logical address values have greater ratios of the number of sectors in the spare area to the number of sectors in the user area.

With the above arrangement, the probability of read or write being impossible due to shortage of spare area is lower in a zone including sectors with lower logical addresses, where user data is recorded with higher probability. At the same time, this group structure can be represented by parameters, and recorded on the disk.

According to another aspect of the invention, there is provided a rewritable optical disk of which recording area is divided into a plurality of groups by annular boundaries; the number of sectors per track differing from one group to another, said optical disk having a spare area provided for each of said groups and having sectors which can be allocated in place of defective sectors of the disk; wherein a read-only area contains a control data area that holds information for controlling recording/reproducing operation from said optical disk, a rewritable area contains a plurality of defect management areas that hold information for controlling replacement of defective sectors, and said control data area contains position information recorded to indicate the positions of said defect management areas.

With the above arrangement, the position information indicating the position of the defect management area is recorded in the control data area provided in a read-only area, and the defect management area in a rewritable area can be accessed by reading the above-mentioned position information. Accordingly, the optical disk apparatus that drives this optical disk is capable of recording or reproduction from the optical disk even if it is not informed of the information related to the layout of the defect management area of the optical disk beforehand.

Even when the optical disk format is modified or added, an apparatus manufactured earlier can be used with the new optical disk. Accordingly, the compatibility of optical disks is significantly enhanced.

It may be so arranged that said position information includes information indicating the start positions, number, or sizes of said defect management areas.

With the above configuration, apparatus manufactured before the changes in or addition of the format can be used despite the changes in such information. The range of allowable format changes and additions greatly increases.

It may be so arranged that the start position of said control data area is always set to a fixed position, irrespective of the recording capacity of the optical disk.

With the above arrangement, it is possible to implement a drive apparatus that can easily record and reproduce data from optical disks with different group structures or capacities.

According to another aspect of the invention, there is provided a rewritable optical disk of which recording area is divided into a plurality of groups by annular boundaries; the number of sectors per track differing from one group to another, said optical disk having a spare area provided for each of said groups and having sectors which can be allocated in place of defective sectors of the disk; wherein a read-only area contains a control data area that holds information for controlling recording/reproducing operation from said optical disk, and a rewritable area contains a plurality of defect management areas that hold information for controlling replacement of defective sectors, wherein said defect management area contains information indicating the first address or size of said spare area.

With the above arrangement, it is possible to obtain all information of the layout of the spare areas from the optical disk and allows the spare areas to be freely configured to suit the use.

The address and size of each spare area can be treated as equivalent information when the spare areas are located at the ends of the respective zones.

According another aspect of the invention, there is provided an optical disk processing apparatus for handling a rewritable optical disk of which recording area is divided into a plurality of groups by annular boundaries; the number of sectors per track differing from one group to another, said optical disk having a spare area provided for each of said groups and having sectors which can be allocated in place of defective sectors of the disk; wherein a read-only area contains a control data area that holds information for controlling recording/reproducing operation from said optical disk, a rewritable area contains a plurality of defect management areas that hold information for controlling replacement of defective sectors, wherein said optical disk processing apparatus specifying the size of said spare area at initialization of said optical disk and recording the specified size or the first address of the spare area in said defect management area.

With the above arrangement, the optical disk processing apparatus can set the size of the spare area as desired at initialization. This setting can be held on the optical disk and can be freely changed at initialization. Since the size of the spare area can be changed as required, the user and application program can determine the size of the spare area when the disk is formatted. Moreover, a unique defect management method can be built, for instance, to perform defect management just by slip processing rather than by replacement, by specifying the size of the spare area to 0, that is, maximizing the user area. A flexible format can be built for use with a variety of optical disks which may be introduced in the future.

According to another aspect of the invention, there is provided an optical disk drive apparatus operable to read and/or write data in user areas of an optical disk, and to use spare areas in place of user areas in case of defects in the user areas, the disk drive apparatus being operable to read from a disk information from which the position and size of spare areas can be determined.

With the above arrangement, it is possible to determine the position and size of the spare area based on the information read from the optical disk.

According to another aspect of the invention, there is provided a rewritable optical disk of which recording area is divided into a plurality of groups by annular boundaries;

the number of sectors per track differing from one group to another, said optical disk having a read-only area containing a control data area that holds information for controlling recording/ reproducing operation from said optical disk, wherein said control data area contains a parameter expressing a linear function of group number for obtaining the number of tracks in a given group or a linear function of group number for obtaining the number of sectors in a given group.

With the above arrangement, the number of tracks in particular groups or the number of sectors per track is a linear function of group number. The zone configuration is identified by using the constant of this function as information indicating the group structure. Accordingly, the disk allows the zone configuration to be identified from fewer parameters than a disk having a table of the numbers of sectors for the respective zones. In addition, by maintaining linear relationships for all parameters determining the zone configuration of the optical disk, the firmware routine of the optical disk drive apparatus can be simplified.

According to a further aspect of the invention, there is provided a rewritable optical disk of which recording area is divided into a plurality of groups by annular boundaries;

the number of sectors per track differing from one group to another, said optical disk having a read-only area containing a control data area that holds information for controlling recording/ reproducing operation from said optical disk, wherein said defect management area contains information for obtaining the number of sectors in the spare area of a given group.

With the above arrangement, the number of spare area sectors in particular groups can be obtained by the use of the information stored in the defect management area. This disk enables the group structure to be identified with a smaller amount of information.

It may be so arranged that said information comprises a parameter of a linear or quadratic function of group number for obtaining the number of sectors in the spare area of said given group.

With the above arrangement, the number of spare area sectors in particular groups is a linear or quadratic function of group number. The number of spare area sectors in each group can be known by using constants of the function as information indicating the group configuration. This disk enables the group structure to be identified with a smaller amount of information than the disk having a table of the numbers of sectors for the respective zones. In addition, by maintaining linear relationships for all parameters determining the number of spare area sectors in the optical disk, the firmware routine of the optical disk drive apparatus can be simplified.

It may be so arranged that said information comprises a ratio of the number of sectors belonging to the spare area to the total number of sectors.

With the above arrangement, the number of sectors in the spare area of particular groups is proportional to the number of sectors in the same group, and the ratio is recorded in the area having the position information of the spare area of each group, so that the zone configuration can be identified with a smaller amount of information than when the firmware of the optical disk drive apparatus uses tables of the size or position of the spare area.

Even when the optical disk drive apparatus drives an optical disk having an unknown disk group structure, the data can be recorded and reproduced by using the position information of the spare area.

BRIEF DESCRIPTION OF THE DRAWINGS

In the accompanying drawings:

FIG. 7A and FIG. 7B show examples of zone sizes of the optical disk of a third embodiment of the present invention;

FIG. 8 shows an example of zone sizes of the optical disk of a fourth embodiment of the present invention;

FIG. 10 shows an example of zone sizes of the optical disk of a fifth embodiment of the present invention;

FIG. 14 shows an example of configuration of the respective zones of the optical disk of a sixth embodiment of the present invention;

FIG. 15 shows another example of configuration of the respective zones of the optical disk of the sixth embodiment of the present invention;

FIG. 17 shows the DAM layout of a conventional optical disk;

FIG. 18A and FIG. 18B show examples of the DAM layout of another conventional optical disk; and FIG. 19 shows the size of the spare area of the conventional optical disk.

DETAILED DESCRIPTION OF THE PREFERRED EMBODIMENTS

Embodiments of the present invention will next be described in detail with reference to drawings.

Embodiment 1

Figure 1:
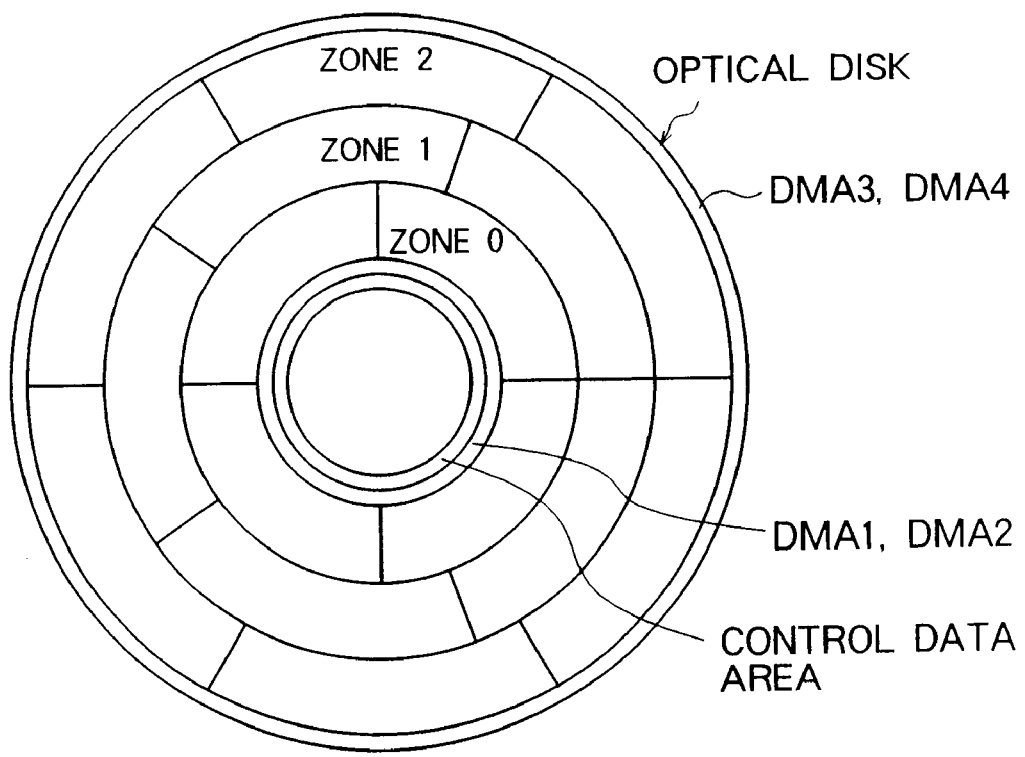
FIG. 1 shows a zone configuration of the optical disk of a first embodiment of the present invention.
Figure 2:
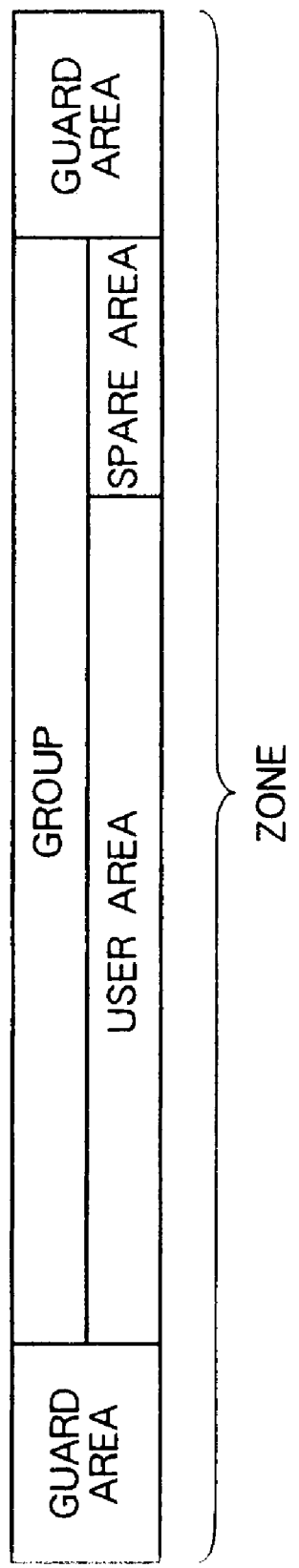
FIG. 2 shows an example of configuration of a zone of the optical disk of the first embodiment of the present invention.

FIG. 1 shows a zone configuration of the optical disk medium of a first embodiment of the present invention. The zones are a plurality of annular areas divided according to their radial positions on the disk, and each zone is formed by a plurality of tracks. Each track consists of recording/reproducing units such as sectors. In FIG. 1, zone 0 consists of four sectors, zone 1 consists of five sectors, and zone 2 consists of six sectors. The number of sectors per track depends on the group. FIG. 2 shows an example of configuration of a zone of the optical disk medium of the first embodiment of the present invention. Each zone consists of a group formed by a user area and a spare area and guard areas on both sides of the group. The guard areas are provided to prevent crosstalk across the boundary of zones, from a track in an adjacent zone. In a ZCAV-format optical disk having preformatted headers, for example, the headers are placed at angular positions different between adjacent tracks across a zone boundary, resulting in crosstalk. Accordingly, several radially innermost and outermost tracks of a zone are not used for recording or reproducing data and are referred to as guard areas. The user area is an area where the user is allowed to record and reproduce data. The spare area is an area having sectors which are used for sectors in the user area in the event that the user area has sectors which have defects or the like, and cannot be used properly for recording or reproduction.

Provided at the radially innermost read-only area of the disk is a control data area for holding information needed to control recording/reproduction, such as the disk rotational speed and laser power required for recording or reproduction.

Figure 11:
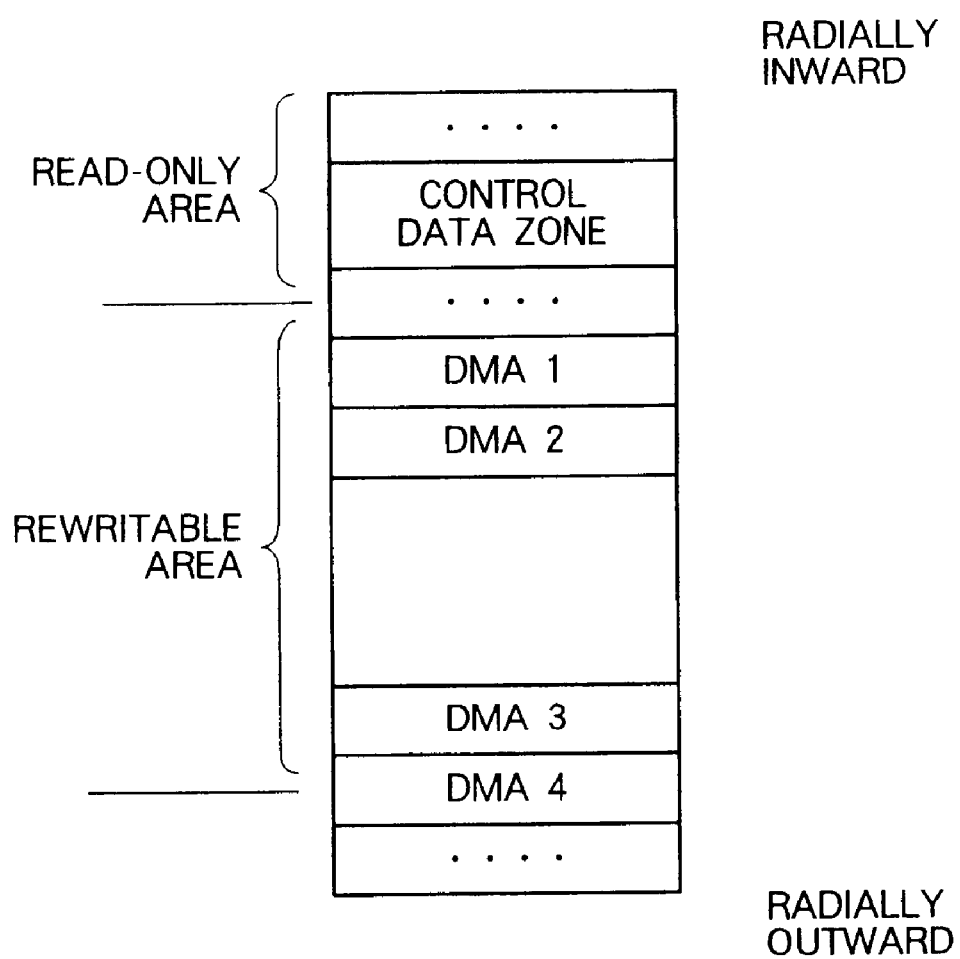
FIG. 11 shows the layout of DMA and control data area of the optical disk of the first embodiment of the present invention.

Provided in the rewritable areas inside the radially innermost zone and outside the radially outermost zone are defect management areas (DMAs) for holding information required to control replacement of defective sectors. FIG. 11 shows the layout of DMAs and control data area on the optical disk medium of the first embodiment of the present invention. In the first embodiment, four DMAs with identical contents are provided to increase the reliability. DMA1 and DMA2 are placed on the radially inward side of the disk while DMA3 and DMA4 are placed on the radially outward side.

Figure 3:
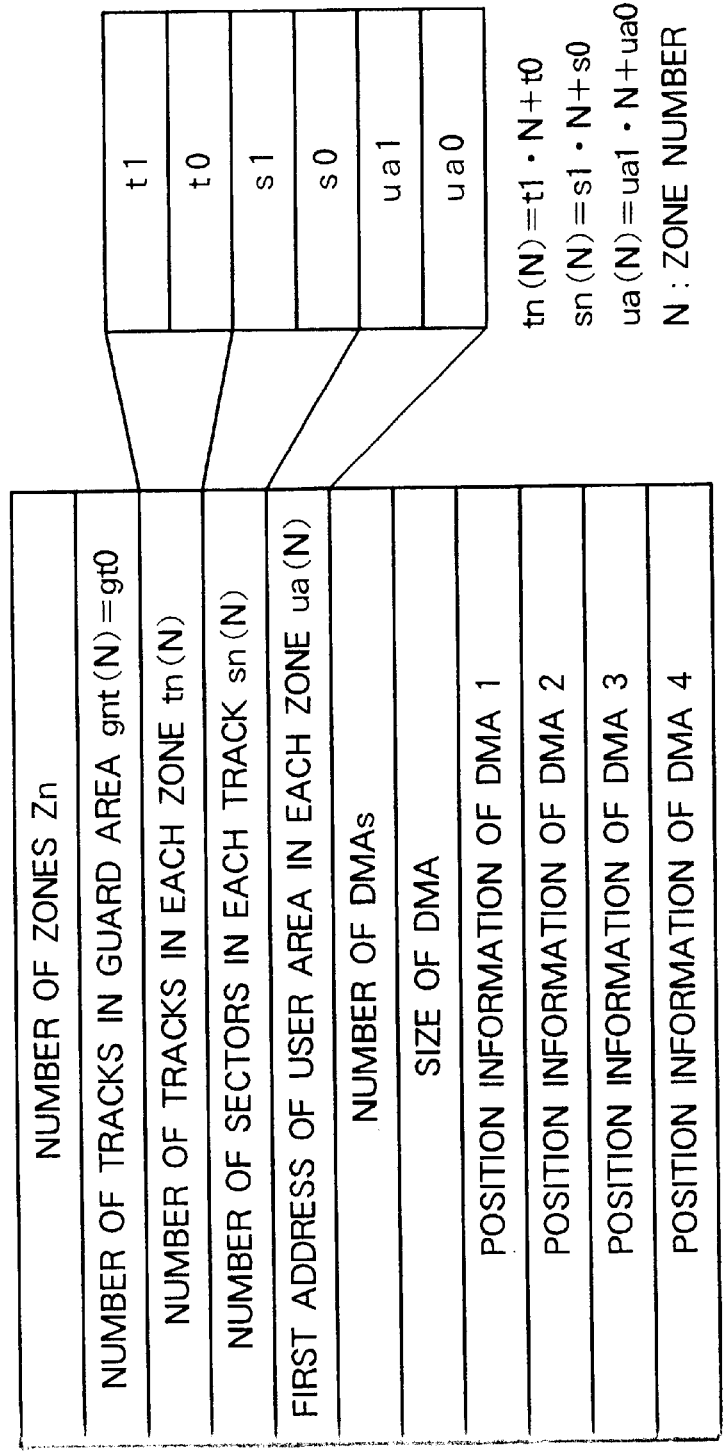
FIG. 3 shows an example of physical format information of the optical disk of the first embodiment of the present invention.

The control data area contains physical format information, which includes the position information recorded to indicate the positions of the defect management areas DMA1 to DMA4 described above. FIG. 3 shows the physical format information in the control data area of the optical disk medium of the first embodiment of the invention. As shown in the figure, the position information includes the information of DMAs such as the number, sizes, and start positions of DMAs. The control data area storing the physical format information is always recorded in the same position, irrespective of the recording capacity of the optical disk.

The physical format information stored in the control data area includes parameters with which the group configuration of the disk can be identified. The parameters include the following:

Number of zones on a disk: zn
Number of tracks in a guard area: gtn(N)
Number of tracks in each zone: tn(N)
Number of sectors in each track: sn(N)
First address of user area in each zone: ua(N)

Here, N is the zone number.

These values and functions indicate the physical configuration of the disk and will not be changed as long as the same disk substrate is used. The disk is configured so that the number of tracks in each zone, tn(N), and the number of sectors in each track, sn(N), can be expressed in the form of a linear function. In FIG. 3, just constants of a linear function are stored for the number of tracks in each zone, tn(N) or the number of sectors in each track, sn(N). If the number of tracks in each zone, tn(N), is given by t1*N+t0, for instance, the constant t1 and the constant t0 are stored as parameters. For the number of sectors in each track, sn(N), the constant s1 and the constant s0 are stored as parameters likewise. The first address of user area in each zone is also recorded just by storing the constants of a corresponding function.

Figure 4:
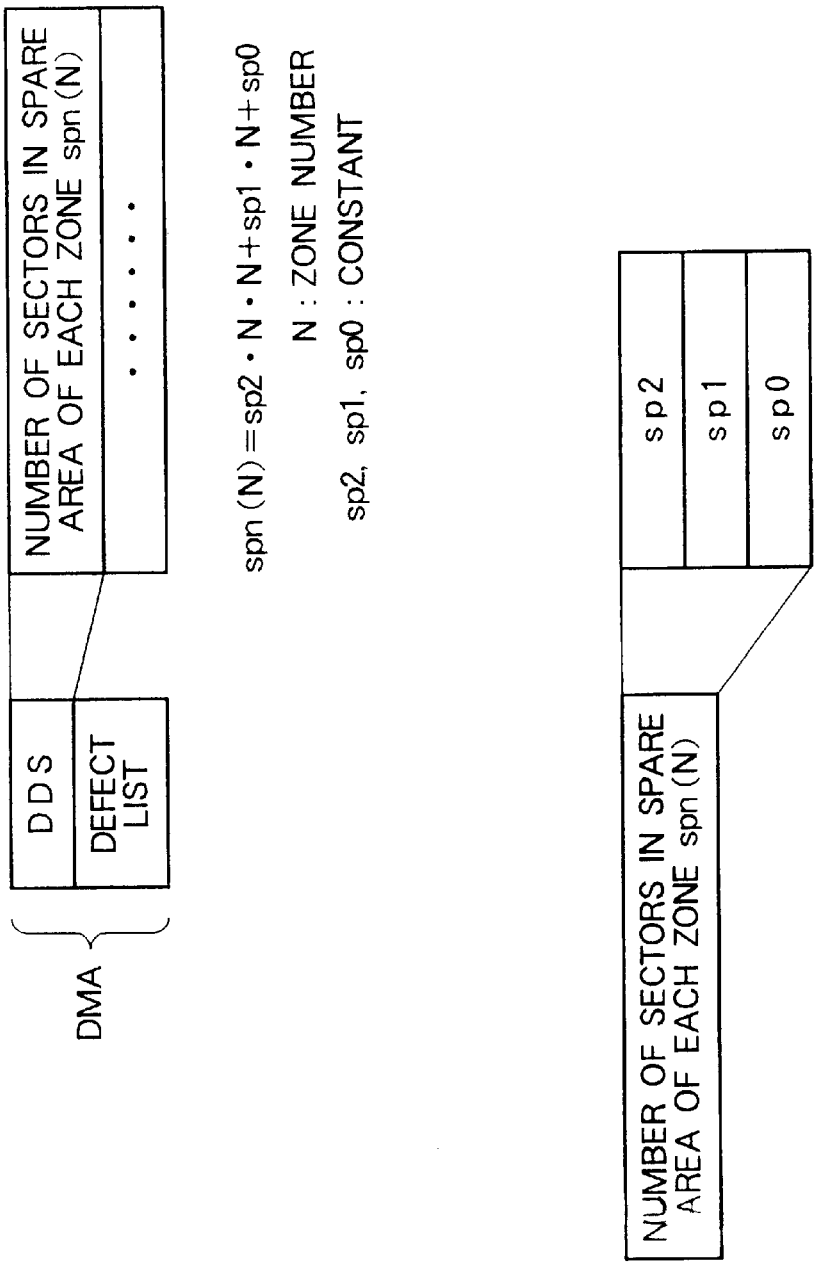
FIG. 4 shows an example of configuration of DMA and DDS of the optical disk of the first embodiment of the present invention.

One of the elements defining the group configuration of a disk is the size of the spare area. The sizes and positions of the spare areas are fixed in the prior art. In this embodiment, however, the sizes of the spare areas are specified at initialization of the optical disk by means of an optical disk processing apparatus, which is not illustrated. The specified sizes or first addresses of the spare areas are recorded in the defect management areas. As has been described above, these areas are used to cope with disk defects. If a sector in the user area cannot be used properly for recording or reproduction because of contamination or medium defect, a sector in the spare area is used instead of the sector that cannot be used for recording or reproduction. The position of the defective sector and the spare area used in place of the defective sector are usually managed by means of a defect list in a defect management area, or DMA. FIG. 4 shows an example of configuration of DMA and DDS of the optical disk medium of the first embodiment of the present invention. Each DMA contains a defect list and a disk definition structure (DDS) which defines the structure of the data area of the disk. In this embodiment, parameters defining the spare area are stored in this area. The number of sectors in the spare area, spn(N), should preferably be set so that the ratios between the user area and the spare area are identical in all zones. The reason therefor is as follows: If a certain zone has a smaller spare area, the spare area in that zone is used up earlier than in other zones. Since the spare area of another zone must be allocated, the frequency of seeking of the head increases, decreasing the data transfer rate.

Since the number of tracks per zone, tn(N), and the number of sectors per track are at most linear functions, the number of sectors per zone is at most a quadratic function. In FIG. 4, the number of sectors in spare area of each zone, spn(N), is expressed by a quadratic function, spn(N)=sp2*N*N+sp1*N+sp0. If the number of tracks per zone is constant, spn(N) can be represented by a linear function.

Figure 12:
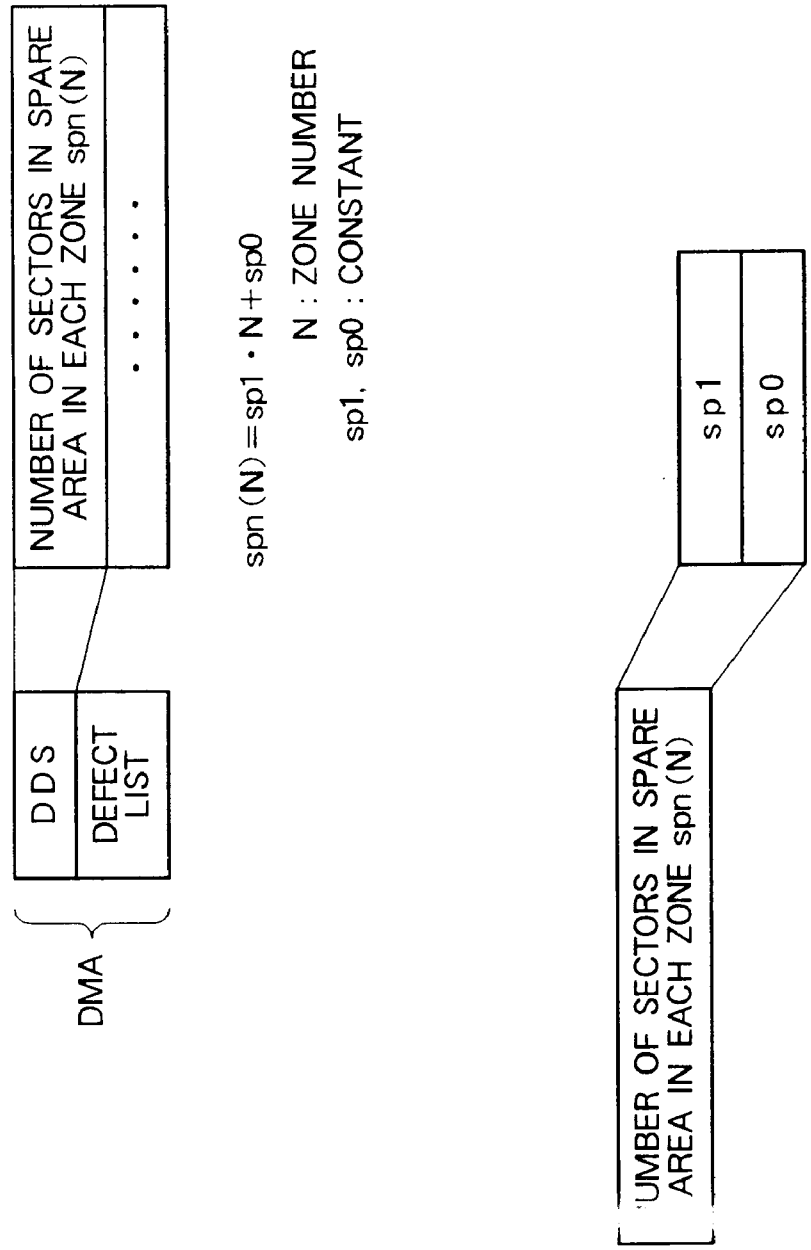
FIG. 12 shows an example of configuration of DMA and DDS of the optical disk of the first embodiment of the present invention.

FIG. 12 shows an example of configuration of DMA and DDS of the optical disk medium of the first embodiment of the present invention.

Like the size of the spare area, the number of tracks in the guard area is specified by recording the parameters of the function. In FIG. 4, the number of tracks in a guard area is a constant, as expressed by gtn(N)=gt0. This is because the necessary guard area is constant, irrespective of the position of the zone.

The number of sectors in the spare area of a zone may alternatively be expressed as a ratio to the number of sectors in the user area. By using this expression, the function recording area can be reduced.

The spare area of each zone can be expressed by means other than the number of sectors, as a function by using the first address of the spare area instead of the size of the spare area.

As the spare area increases, the disk's immunity to defect generally increases, but the area that the user can use decreases. That is, the user data capacity of the disk decreases. The size of the spare area of the conventional optical disk is set to such a value that sufficient reliability can be ensured, on the basis of the user data error rate calculated from the defect rate of the disk. When recording image or sound information, some applications require a longer recording capacity (time) even if the defect ratio increases somewhat. The usefulness can be enhanced by making it possible to change the position and size of the spare area in each zone variable rather than by fixing them. This can be achieved by recording the layout information of the spare area of each zone in a rewritable area, as shown in FIG. 4. The information is recorded when the disk is initialized.

The start position of the spare area of each zone may be stored in the DDS area, but the start position of the spare area need not be stored if the spare area is configured to begin immediately after the user area, without leaving any gap in between.

In this way, the user or application program can determine the size of the spare area when the disk is initialized. This makes it possible, for instance, to set the size of the spare area to 0 and maximize the user area, and, in addition, to build a unique defect management system in which just the file system of the host computer manages defects, for instance.

The disk is formed so that the zone configuration can be known just from the parameters of the physical format information and DDS. This makes it easy to establish the firmware of a disk drive apparatus that is capable of recording and reproduction from media using a variety of formats, which may be used in the future. The disk group structures corresponding to the plurality of formats need not be stored. If a disk having a new group structure is introduced after the apparatus is manufactured, the firmware requires fewer modifications than before. If reproduction with the physical properties which are the same as before is possible, no modification may be required for the reproduction.

To obtain the group configuration from the information described above, DDS contained in the DMA must be correctly read. As shown in FIG. 3, if there are four DMAs and if DMA1 and DMA2 are placed on the radially inward side of the disk and DMA3 and DMA4 are placed on the radially outward side of the disk, the positions of the radially outward DMA3 and DMA4 will vary according to the disk capacity or disk radius. Accordingly, the position information of DMAs is recorded in the physical format information section of the control data zone in the read-only area of the disk. The sizes and number of DMAs are also recorded together. By doing this, the positions of DMAs can be known by reading the physical format information section first even if the disk size varies. Because the position information is recorded as pre-pits in the read-only area, the danger of accidental erasure can be eliminated. The recording position of the physical format information section is set to an identical address in any types of disks.

However, if a plurality of types of disks required different rotational speeds or different modulation methods, it would be difficult to read the control data zone. Accordingly, it is desirable that the modulation method be unified so that compatibility can be easily ensured, and at least the data in the control data zone be recorded in such a format that the data can be read even if the disk type is not known.

Figure 5:
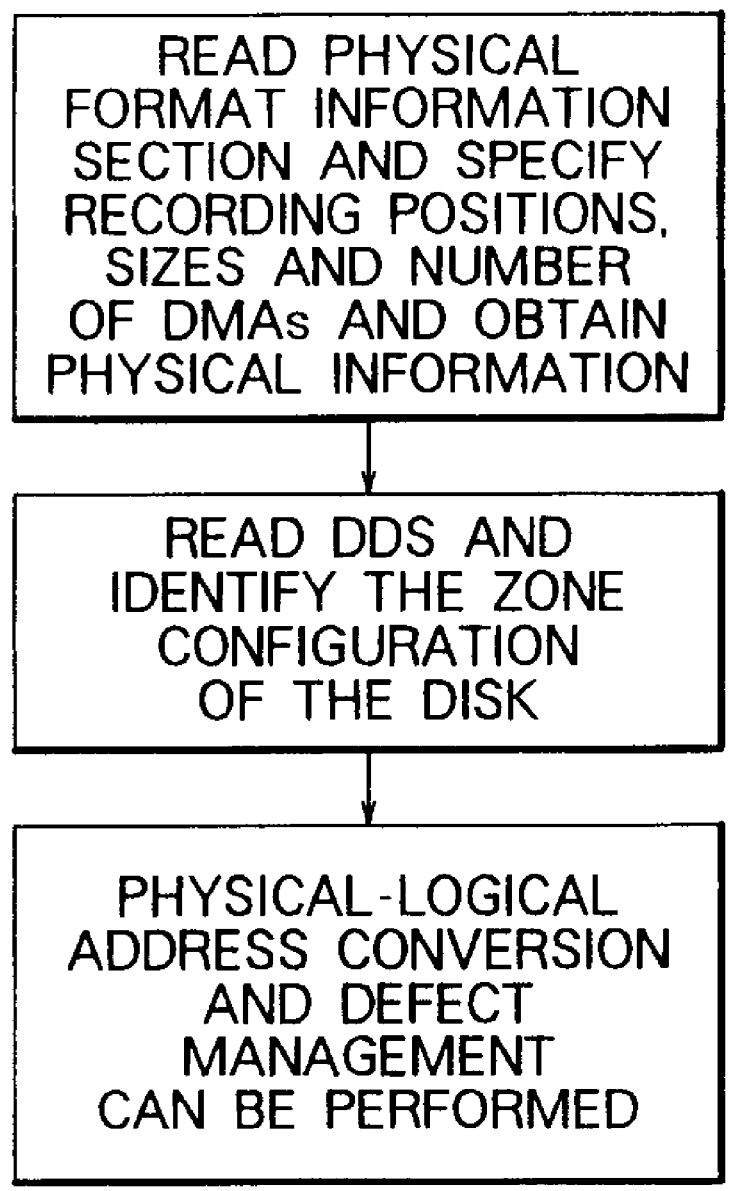
FIG. 5 shows a flow of processing when a disk is loaded on the optical disk drive apparatus of the first embodiment of the present invention.
Figure 13:
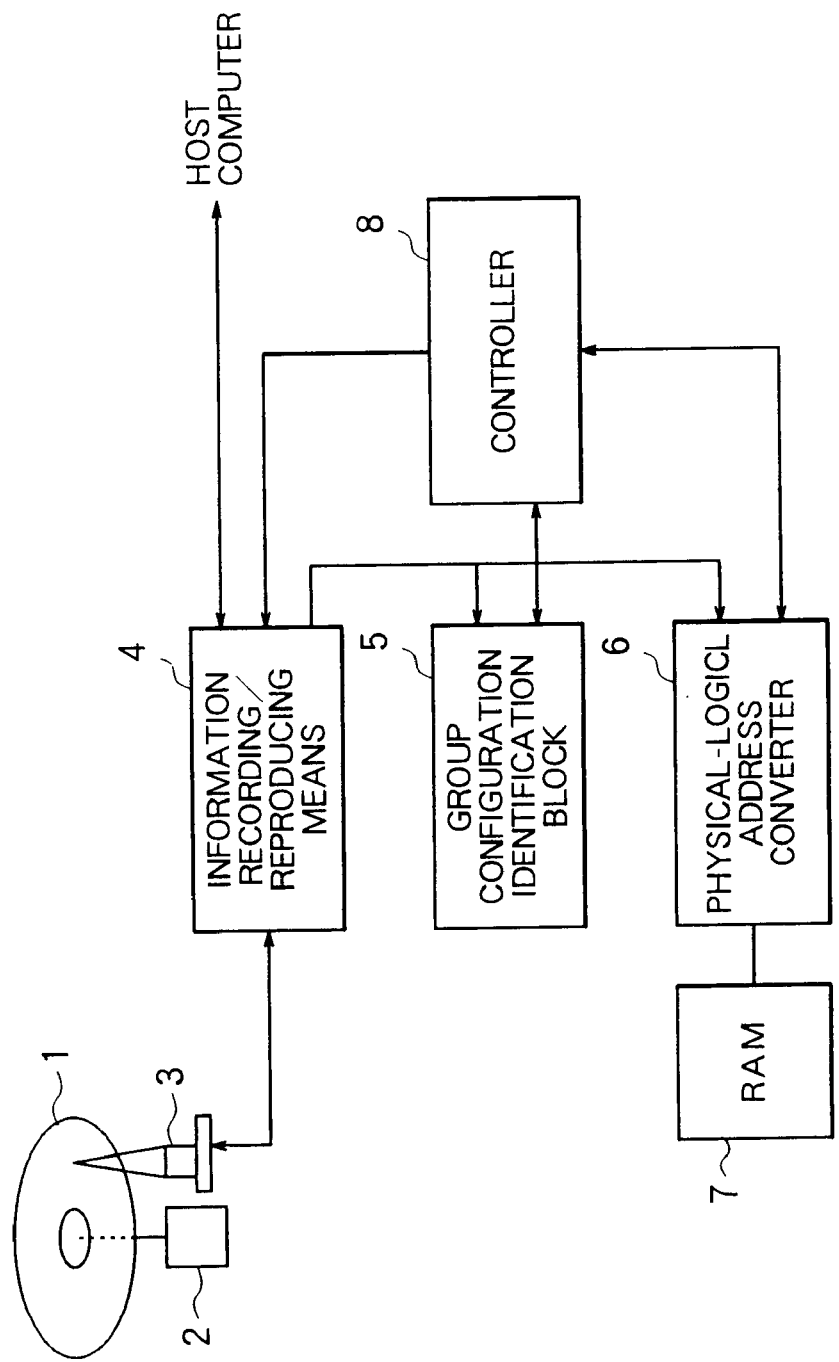
FIG. 13 shows a configuration of the optical disk processing apparatus of the first embodiment of the present invention.
Figure 16:
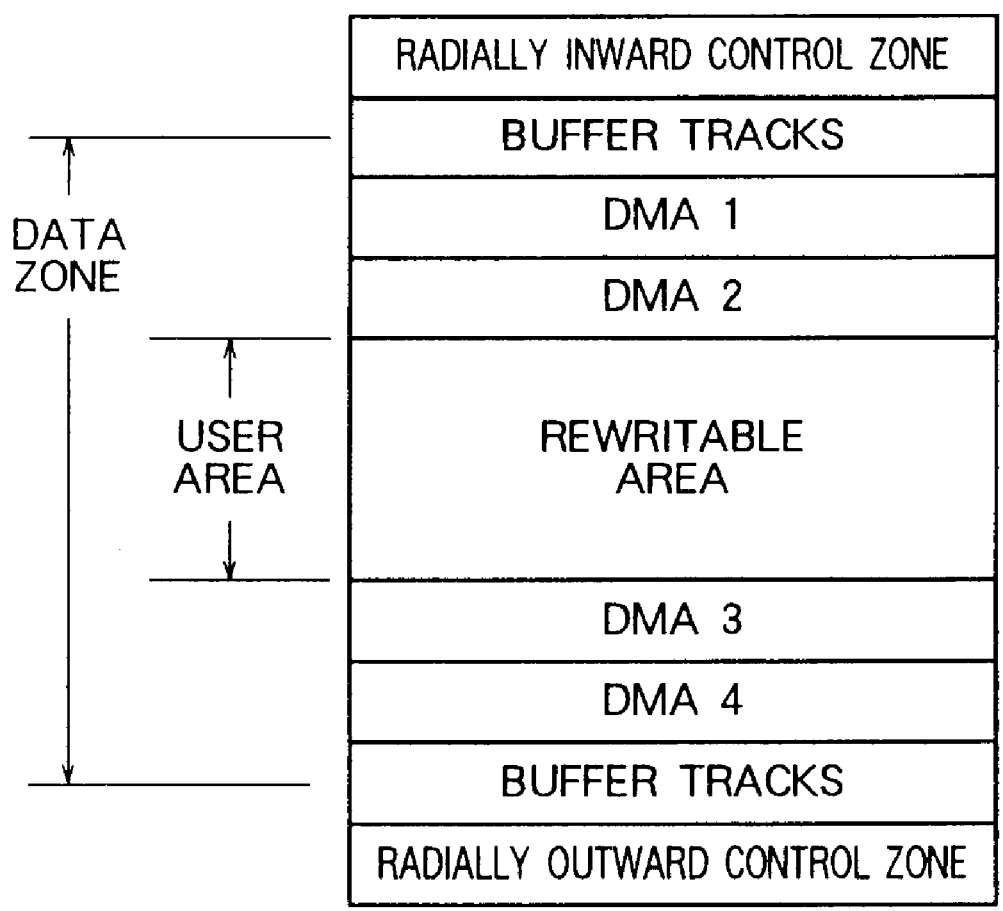
FIG. 16 shows the configuration of a data zone of a conventional optical disk.

FIG. 5 shows a flow of processing when a disk is loaded on the optical disk drive apparatus of the first embodiment of the present invention. FIG. 13 shows a configuration of the optical disk processing apparatus of the first embodiment of the present invention. In FIG. 13, the reference numeral 1 denotes an optical disk, the reference numeral 2 denotes a disk motor, the reference numeral 3 denotes an optical head, and the reference numeral 4 denotes an information recording/reproducing means containing an error corrector and modulator/demodulator. The reference numeral 5 denotes a group configuration identification section that identifies the group configuration of an optical disk from the following information: number of zones, zn; number of tracks in each zone, tn(N); number of sectors in each track, sn(N); number of tracks in a guard area, gtn(N); and first address of user area in each zone, ua(N). The reference numeral 6 denotes a physical logical address converter that locates the spare area of each zone according to the spare area information in the DMAs and converts the logical address sent from the host computer when a disk is read or written, for instance, into a physical address. The reference numeral 7 denotes a RAM that stores a defect list. The reference numeral 8 denotes a controller that controls the various sections. The processing apparatus shown in FIG. 13 reads and writes data on an optical disk as described below. When a disk is loaded, the physical format information section in the control data area is read first. The read information provides the number of zones, zn, number of tracks in each zone, tn(N), number of sectors in each track, sn(N), number of tracks in a guard area, gtn(N), and first address of user area in a zone, ua(N), which are sent to the group configuration identification section 5. Then, the position of each DMA is located from the provided positions, number, and sizes of DMAS. The DMA is accessed to read the information including the defect management information, from which the number of sectors in a spare area, spn(N), is obtained. At the same time, a defect management table is stored in the RAM 7. Based on the information, the physical-logical address converter 6 identifies the group configuration, and the positions and sizes of the spare areas are known. Accordingly, the logical address of a sector to be read or written, sent from the host computer can be converted into a physical address with reference to the defect management table in the RAM 7.

Embodiment 2

Figure 6:
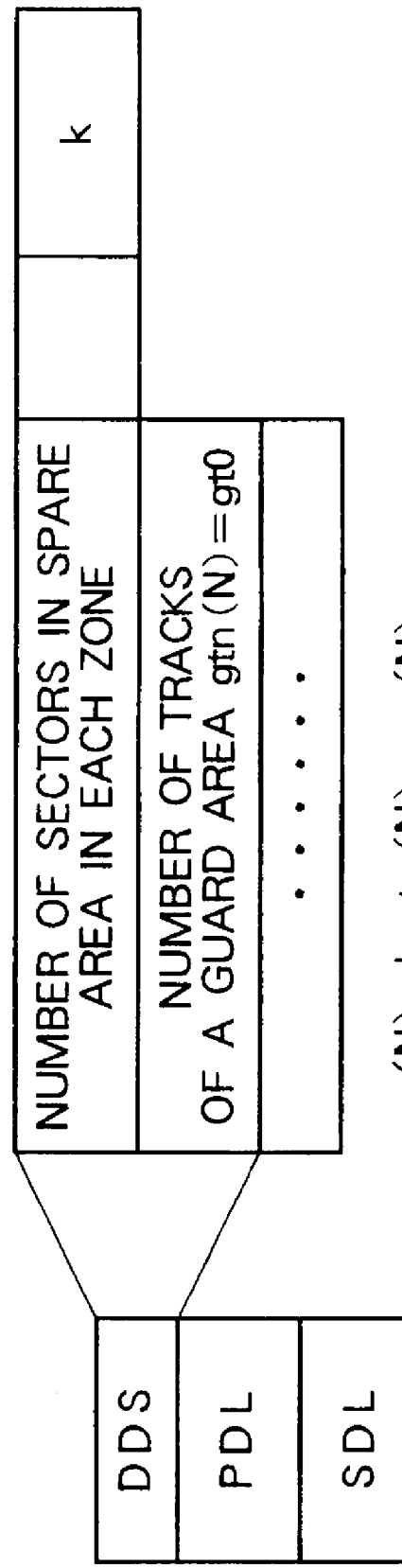
FIG. 6 shows an example of DDS configuration of the optical disk of a second embodiment of the present invention.

In the first embodiment, the number of sectors in the spare area of each zone is defined as at most a quadratic function, and the constants of the function are recorded as parameters in the DDS area. In the second embodiment, the number of sectors in the spare area of each zone is set to be proportional to the total number of sectors in the zone, and the ratio is recorded in the DDS area as a parameter indicating the group configuration. FIG. 6 shows an example of configuration of DDS of the optical disk medium of the second embodiment of the present invention. As shown in the figure, the number of sectors in the spare area of each zone, sn(N), is k (constant) times the number of sectors in the zone, tn(N) *sn(N), and just the constant k is stored in the DDS area. In comparison with the first embodiment, the second embodiment requires fewer parameters to be stored and makes it easier to know the group configuration.

Embodiment 3

In the first embodiment, the size of the spare area is set as a linear function so that the ratio of the spare area to the user area is constant. FIG. 7A and FIG. 7B show examples of combinations of zone sizes of the optical disk medium of the third embodiment of the present invention. In the example shown in FIG. 7A, the radially inner zones are assigned lower logical addresses. Both the number of sectors in a user area, us, and the number of sectors in a spare area, ss, are linear functions of zone number. However, the ratio of the number of sectors in a spare area to the number of sectors in a user area is higher in the radially inner zones than in the radially outer zones.

The logical address is an address value assigned sequentially from the beginning of the user area. In the optical disk of this embodiment, the logical addresses are assigned from the radially inward position to the radially outward position. Data is recorded sequentially from the radially inward position of the disk. Accordingly, a radially inner areas are subjected to recording or reproduction more frequently. If the sizes of the spare areas are set in the manner of this embodiment, this group configuration can be easily represented by parameters and recorded on the disk. By increasing the ratio of the spare area in the radially inner zones, thereby decreasing the recording/reproducing failure rate in the zones which are subjected to recording or reproduced more frequently, it is possible to provide the spare area at a ratio to the user area according to the frequency of access to the zone.

It is rare that the entire surface of the disk is used up, and areas with lower logical addresses are used more frequently. The above-described method uses the spare areas efficiently, matching the practical use condition. A similar effect can be obtained if extra spare areas are allocated to the zones where the frequency of replacement is higher, in a disk having more spare areas than the number of replacement which can be recorded in the defect list.

In the example illustrated in FIG. 7A, the logical addresses are assigned from the radially inward position to the radially outward position of the disk. If the logical addresses are assigned from the radially outward position to the radially inward position, radially outward zones are made to have a larger ratio of the spare area size to the user area size. An example is shown in FIG. 7B.

The tables shown in FIG. 7A or FIG. 7B may be recorded in the DDS if the capacity of the DDS permits.

Embodiment 4

Figure 9:
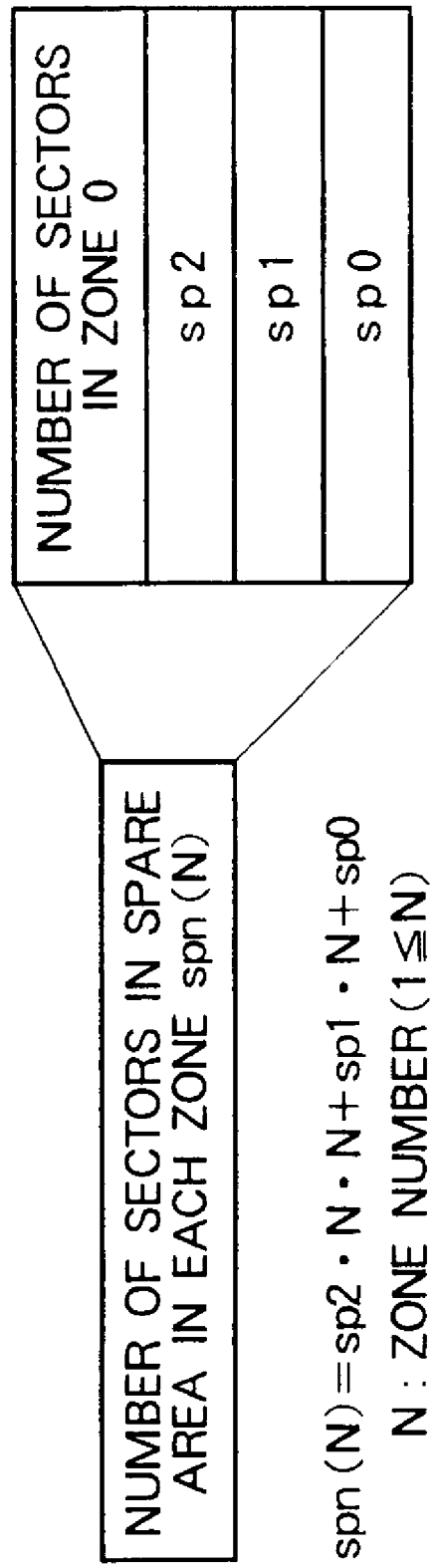
FIG. 9 shows the layout of parameters indicating the number of sectors in the spare areas of the zones of the optical disk of the fourth embodiment of the present invention.

When the disk of a fourth embodiment is used as a storage medium for computers, user data is recorded in files according to a logical format such as the universal disk format (UDF) or DOS. In the logical format used for this embodiment, descriptors such as a file recording position, size, attribute, and the like are recorded in the vicinity of the location of the lowest logical address value, e.g., "0". In a disk in which logical addresses are assigned sequentially from the radially inward position to the radially outward position, for instance, those descriptors are stored in the radially innermost zone. FIG. 8 shows an example of zone sizes of the optical disk medium of the fourth embodiment of the present invention. In the disk having zones as shown in the figure, the descriptors are stored in the radially innermost zone, and the ratio of the spare area to the user area in the radially innermost zone 0 is higher than the corresponding ratios in other zones. FIG. 9 shows the layout of parameters that indicate the number of sectors in the spare area of each zone of the optical disk medium of the fourth embodiment of the present invention. As shown in the figure, the function representing the number of sectors in the spare area of each zone, spn(N), contained in the DDS area is used only when N is 1 or above. When N is 0, a separately recorded value is used.

The tables shown in FIG. 8 may be recorded in the DDS if the capacity of the DDS permits.

With this disk configuration, the degree of degradation in access performance caused by an increase in the number of defective sectors due to defect or contamination in the zone including the important descriptors of the logical format can be significantly reduced. Since it becomes rarer for the time taken to read or write the descriptors to be long, a disk with high immunity to defects can be provided.

The descriptors used for file management are accessed each time the data on a disk is reproduced, recorded, or erased. If the number of defective sectors in the zone in which the descriptors are stored increases and if a spare area of another zone is used as a result of defect replacement, a long-distance seek operation will frequently occur. This situation can be avoided by using the spare area allocation method of the fourth embodiment.

Embodiment 5

In the disk of a fifth embodiment, the descriptors such as file recording position, size, and attribute are recorded in the vicinity of the location with the lowest logical address, e.g., "0", and in the vicinity of the location with the highest logical address. FIG. 10 shows an example of zone sizes of the optical disk medium of the fifth embodiment of the present invention. The disk shown in the figure stores the descriptors in both the radially innermost zone and the radially outermost zone. The ratios of the spare area to the user area in the radially innermost zone 0 and radially outermost zone 6 are higher than those in other zones. Accordingly, it is possible to obtain a disk which uses a file format having such a logical format that the descriptors are stored in the radially innermost zone and radially outermost zone of the disk, and which has less degradation in access performance against defect.

With this disk configuration, a disk with increased immunity to defect can be provided, as in the fourth embodiment, because the number of defective sectors due to defect or contamination which are permitted in the zone including the important descriptors of the logical format is increased, and it becomes rarer for the time taken to read or write the descriptors to become long.

The tables shown in 10 may be recorded in the DDS if the capacity of the DDS permits.

The sector mentioned in this specification means a recording/reproducing unit. In a system in which a plurality of sectors are treated as a single block to which an error correction code is added, for instance, the word "sector" can be read as meaning a block.

Embodiment 6

FIG. 14 shows a zone and group configuration applied to an 120 mm diameter optical disk and an example of allocation of the user area and spare area in each group. As shown in the "zone number" column of the figure, the disk surface is divided into 35 zones, of which zone numbers range from 0 to 34, and a group consisting of a user area and spare area is formed in each zone. The logical addresses are sequentially assigned to the sectors of the user area, from the radially inward sector to the radially outward sector, starting from the radially innermost part of the disk.

The track pitch is fixed to 0.59 $\mu$m, and zone 0 starts from a disk position with a radial position (radial distance from the center) of 24 mm. In the "radius" column of the figure, the starting radial position of each zone is indicated. In each zone, a single track consists of sectors of which number is expressed as sn(N) in the figure. In zone 0, for instance, a single track has 25 sectors, and the number of sectors per track increases by one upon every transition to an outward adjacent zone. Since the number of tracks in each zone is set to 1632, each zone has a radial width of about 0.96 mm, as shown in the figure. However, zone 34 has 1344 tracks. This is because the radial position of the outermost track is set to 57.53 mm so that that it is at a position about 2.5 mm inside the disk edge, in consideration of variations in the characteristics of the recording film of the disk.

In this example shown, 16 sectors with consecutive logical addresses are treated as a single block in reading or reproducing data. The number of blocks in each zone is indicated in the "bn(N)" column of the figure. The value bn(N) of each zone is given by this expression: bn(N)=sn (N)×tn(N)/16. In zones 0 to 33, bn(N) sn(N)×1632/16. In zone 34, which has less tracks, bn(N)=sn(N)×1344/16.

The area consisting of bn(N) blocks in each zone consists of user blocks UB which form the user area, spare blocks SB which form the spare area, and guard blocks GB1 and GB2 which form the guard areas positioned on the radially inward side and radially outward side of the user and spare areas. UB and SB form a single group.

Each of GB1 and GB2 is formed of sectors of an integer number of blocks so as to have at least two-track length, i.e., to satisfy gtn (N)=gt0=2. Accordingly, radially outward zones have a gradually increasing number of blocks in GB1 and GB2. GB1 of zone 0 contains the block of the lead-in area placed in the radially innermost position of the disk as well as the blocks of the usual guard area. Therefore, the number of blocks is increased, and is 256. In the lead-in area, the defect management area and other area necessary for controlling the optical disk drive are placed.

The number of blocks in the guard area that satisfies the requirements described above can be obtained by calculation. In this embodiment, the number can be obtained through the following calculation using the number of sectors per track, sn(N): GB1=GB2=INT[(sn(N)×gt0−1)/ 16]+1. The symbol INT [.] means that all digits to the right of the decimal point are discarded. Therefore, in an actual optical disk apparatus, GB1 and GB2 of each zone can be calculated from the number of sectors per track, sn(N).

The number of spare blocks in each zone, SB, is 75 in zone 0, and the other spare blocks are allocated so that the number increases by three upon every transition to an outward adjacent zone and each time the zone number increases by one, as shown in the figure. The number of sectors in the spare area of group number N, spn(N), is expressed as spn(N)=(3N+75)×16=48N+1200. If the values "48" and "1200" of this expression are stored in the defect management area as parameters indicating the spare area size, the number of spare sectors in each group can be easily obtained.

Instead of spn (N), the number of spare blocks, spb (N), may be defined as spb (N)=spn (N)/16 and may be determined by spb (N)=3N+75. The values stored in the defect management area as the parameters indicating the size of the spare area are "3" and "75", and are thus smaller, and they can be easily handled because they can be recorded with a smaller number of bits. Of course, spb(N) can be used to calculate the spare area size in the same way as spn(N).

In the "SB/UB" column of the figure, the ratio of the number of spare blocks, SB, to the number of user blocks, UB, in each group is indicated. In the example shown, the number of spare blocks allocated in each group of zones 1 to 33 is 3.04% of the number of corresponding user blocks. In the radially innermost zone 0, and the radially outermost zone 34, where the information for managing the files recorded on this disk and other important information used for the file system are placed, the ratios of the number of allocated spare blocks to the number of user blocks are 3.39% and 3.72% respectively, which are higher than those in other zones.

By doing this, an optical disk with high immunity to defect can be provided, as explained in connection with the fourth and fifth embodiments above.

FIG. 15 shows another example of allocation of user area blocks and spare area blocks in an optical disk having the same zone configuration as that shown in FIG. 14. The number of zones, number of tracks in each zone, track pitch, radial positions, number of sectors per track, and number of sectors per block are not changed. The logical addresses are sequentially assigned in the same way, that is, from radially inward sectors to radially outward sectors in the user areas, starting from the radially innermost sector of the disk. Accordingly, the "bn(N)" value of each zone is the same as that of the example shown in FIG. 14.

The number of spare blocks allocated to each zone, SB, is 90 in zone 0, as shown in the figure, and increases by two upon every transition to an outward adjacent zone and each time the zone number increases by one. Accordingly, the number of sectors in the spare area of group N, spn (N), is expressed as follows: spn(N)=(2N+90)×16=32N+1440. When the values "32" and "1440" in this expression are stored in the defect management area as parameters indicating the size of the spare area, the number of spare sectors in each group can be easily obtained.

As in the preceding example, the number of spare blocks, spb(N), may be used instead of spn(N) and defined as spb(N)=2N+90. When this is done, the values stored in the defect management area as parameters indicating the size of the spare area are "2" and "90".

In the "SB/UB" column of the figure, the ratio of the number of spare blocks, SB, to the number of user blocks, UB, in each group is indicated. In the example shown, the allocation to the groups in zones 1 to 33 is made so that the spare block ratio SB/UB gradually decreases toward the radially outer zones with higher logical addresses. The spare blocks are allocated in such a manner that the ratio to the number of user blocks changes from about 3.61% to 2.72%. In the radially innermost zone 0, and the radially outermost zone 34, where the information for managing the files recorded on this disk and other important information of the file system are placed, the ratios of allocated spare blocks are 4.09% and 3.78% respectively, which are higher than the ratios in other zones.

By doing this, an optical disk with high immunity to defect can be provided, as described in connection with FIG. 14. In addition, more spare areas can be placed near the user areas in radially inward groups which are more frequently used, and the degradation in average access performance can be minimized even if the spare areas are getting short.

When the allocation of the spare areas is specified as shown in FIG. 14, the total number of spare area blocks is 4410. When the allocation of spare areas is specified as shown in FIG. 15, the total number of spare area blocks is 4362. Meanwhile, the number of defects that can be stored in the list provided for defect replacement in the defect management area of the disk is limited by the maximum length of the list. Generally, when the disk is loaded on in the drive, the whole list is read, stored in the memory of the apparatus, and used. Accordingly, the size of the memory of the apparatus estimated to be used generally determines the maximum length of the list for defect replacement.

If, as a typical example, the information for entry of a single defect is represented by eight bytes on the list and if a 32K-byte memory is used, the replacement information of up to 4096 defects can be stored at the same time. If the number of spare area blocks is 4410 or 4362 as described above, the list for defect replacement can be fully used because the number of spare blocks is greater than the number of defect replacement information entries, which is 4096.

Because more than 4096 spare blocks are provided and allocated to the groups, groups with higher incidences of defects can use the spare area in the same group with higher priorities, and groups with lower incidences of defects use the spare area in the same group with lower frequencies. Accordingly, the probability of replacement to spare areas across the group boundaries decreases, and the degradation in average access performance can be minimized even if there are many defects.

What is claimed is:

1. A rewritable optical disk of which recording area is divided into a plurality of groups arranged from an inner group to an outer group and having annular boundaries; the number of sectors per track differing from one group to another, said optical disk having a spare area associated with each of said groups and having sectors which can be allocated in place of defective sectors of the disk; wherein
   a control data area holding information for controlling recording/reproducing operation from said optical disk,
   a plurality of defect management areas holding information for controlling replacement of defective sectors, and
   said control data area contains position information recorded to indicate the positions of at least one of said defect management areas,
   said spare area having a size that may be varied as needed;
   the total space occupied by said recording area and spare area being substantially constant so that reducing the size of said spare area increases the size of said recording area, and
   the ratio of the spare area to recording area being greater in one of said inner and said outer group than in other of said plurality of groups.

2. The optical disk according to claim 1, wherein said position information includes information indicating the start positions, number, or sizes of said defect management areas.

3. The optical disk according to claim 1, wherein the start position of said control data area is always set to a fixed position, irrespective of the recording capacity of the optical disk.

4. The rewritable optical disk of claim 1 wherein said spare area associated with each of said groups is physically located within said group.

5. A rewritable optical disk comprising:
   a single spiral land/groove disk having offset header information; said disk having a storage portion including,
   a control data area,
   a recording area divided into a plurality of annular zones arranged from an inner zone to an outer zone, each annular zone having a differing number of sectors per track and including a user area in which the user may record and reproduce information, and
   a spare area provided on said disk and having sectors that can be allocated in place of defective sectors of the disk;
   said control data area including a spare area size field related to the selected size of said spare area,
   said spare area having a size that may be varied as needed;
   the total space occupied by said recording area and spare area being substantially constant so that reducing the size of said spare area increases the size of said recording area, and
   the ratio of the spare area to recording area being greater in one of said inner and said outer zone than in other of said plurality of zones.

6. A rewritable optical disk of which recording area is divided into a plurality of groups arranged from an inner group to an outer group and having annular boundaries;
   the number of sectors per track differing from one group to another,
   said optical disk having
      a spare area associated with each of said plurality of groups;
      a defect management area; and
      a control data area that holds information for controlling recording/reproducing operation from said optical disk,
   wherein
      said defect management area contains information for obtaining the number of sectors in the spare area of a given group,
      said spare area having a size that may be varied as needed;
      the total space occupied by said recording area and spare area being substantially constant so that reducing the size of said spare area increases the size of said recording area, and
      the ratio of the spare area to recording area being greater in one of said inner and said outer group than in other of said plurality of groups.

7. The rewritable optical disk of claim 6, wherein
   said information comprises a parameter of a linear or quadratic function of group number for obtaining the number of sectors in the spare area of said given group.

8. The rewritable optical disk of claim 6, wherein
   said information comprises a ratio of the number of sectors belonging to the spare area to the total number of sectors belonging to said given group.

* * * * *